US008825874B2

(12) United States Patent  (10) Patent No.: US 8,825,874 B2
Pandya et al.  (45) Date of Patent: Sep. 2, 2014

(54) EXTENDING REVALIDATION-TIME OF DIAMETER SESSIONS

(75) Inventors: Ajay Kirit Pandya, Ottawa (CA); Susan Patricia Ackerman, Kanata (CA); Katha Kulasingam, Kanata (CA); Michael Tofinetti, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 863 days.

(21) Appl. No.: 12/814,997

(22) Filed: Jun. 14, 2010

(65) Prior Publication Data

US 2011/0307790 A1    Dec. 15, 2011

(51) Int. Cl.
    *G06F 15/16*    (2006.01)
(52) U.S. Cl.
    USPC ............ 709/227; 709/206; 709/228; 719/318
(58) Field of Classification Search
    USPC .................. 709/223–229, 206–207; 719/318
    See application file for complete search history.

(56) References Cited

U.S. PATENT DOCUMENTS

| 2003/0079021 | A1* | 4/2003 | Fan .............................. 709/227 |
| 2004/0260589 | A1* | 12/2004 | Varadarajan et al. ............. 705/8 |
| 2006/0104262 | A1* | 5/2006 | Kant et al. .................... 370/352 |
| 2010/0211643 | A1* | 8/2010 | Lowenthal et al. ........... 709/206 |
| 2010/0223348 | A1* | 9/2010 | Przybysz et al. .............. 709/227 |
| 2011/0167150 | A1* | 7/2011 | Riley et al. .................... 709/224 |
| 2011/0225113 | A1* | 9/2011 | Mann .............................. 706/47 |
| 2011/0225280 | A1* | 9/2011 | Delsesto et al. .............. 709/223 |

* cited by examiner

*Primary Examiner* — Bharat N Barot
(74) *Attorney, Agent, or Firm* — Kramer Amado P.C.

(57) ABSTRACT

Various exemplary embodiments relate to a method performed by a Policy Charging and Control Node (PCRN) for updating a session associated with a subscriber in response to an event. The method may include receiving at the PCRN an event message indicating that an event has occurred within the session; retrieving subscriber information including at least one incremental value associated with the event for the subscriber; determining an updated value based on the at least one retrieved incremental value and at least one reference value; and responding to the event message with an update message including the updated value. Various exemplary embodiments may further include configuring a subscriber profile repository to include at least one incremental value and terminating the session if the subscriber is not allowed to use incremental updates or no incremental value is defined for the subscriber.

19 Claims, 5 Drawing Sheets

| Session ID | Subscription ID | IP Address | PCC Rules | QoS Rules | Event Triggers | Revalidation Time |
|---|---|---|---|---|---|---|
| 0x284B | 1000000000000001 | 123.45.67.89 | {0x12B1; 0x32C3} | {0x12B1; 0x32C3} | {2,6,17} | 13B2:38F9:2392:3929: 2092:B293:A392:284D |
| 0x72A3 | 1000000000000002 | 123.12.3.1 | {0xA903} | {0xA903} | {14} | 0 |
| ... | ... | ... | ... | ... | ... | ... |

| Subscription ID | Enable Extensions | Extension Time | Enable Credit Increase | Credit Increase Amount |
|---|---|---|---|---|
| 1000000000000001 | True | 24 hours | True | 100 |
| 1000000000000002 | True | 1 week | False | 0 |
| ... | | | | ... |

FIG. 5

| Conditions | Action |
|---|---|
| Event Trigger = 17; Enable Extensions = True | Revalidation Timeout = Current Time + Extension Time |
| Event Trigger = 15; Enable Credit Increase = True | Credit = Credit Increase Amount |
| ... | ... |

EXTENDING REVALIDATION-TIME OF DIAMETER SESSIONS

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on reporting events between the PCRF and the PCEF or BBERF. 3GPP TS 29.212 defines several event triggers that the PCRF may provision to request that the PCEF or BBERF to report an event when it occurs. For example, the PCRF might provision a REVALIDATION_TIMEOUT event trigger to the PCEF to indicate the end of a session. The PCEF would then report to the PCRF when a revalidation timeout has occurred.

The 3GPP standards, however, provide little guidance about how the PCRF should respond to events. For example, the specifications provide that the PCRF may provide a new value for the revalidation timeout, but do not indicate how to determine a new value. Methods using fixed absolute values could be used to respond to all events but would limit the variety of options available.

In view of the foregoing, it would be desirable to provide a Policy and Charging Rules Node (PCRN) implementing a PCRF capable of responding to network events on a per subscriber basis or per session basis. In particular, it would be desirable for the PCRN to respond to revalidation timeout events so that some subscribers may extend their sessions.

SUMMARY

In light of the present need for a PCRN for responding to network events in a flexible manner, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Policy Charging and Control Node (PCRN) for updating a session associated with a subscriber in response to an event. The method may include receiving at the PCRN an event message indicating that an event has occurred within the session; retrieving subscriber information including at least one incremental value associated with the event for the subscriber; determining an updated value based on the at least one retrieved incremental value and at least one reference value; and responding to the event message with an update message including the updated value. The method may also include configuring a subscriber profile repository to include at least one incremental value. If no incremental value is defined for a subscriber or the subscriber is not allowed to use incremental updates, the method may include terminating the session. Various exemplary embodiments may relate to the above method encoded on a machine-readable medium as instructions for a PCRN to respond to event messages.

The method may be used to extend the revalidation timeout of Diameter sessions by defining an incremental value for an extension time for each subscriber. When the PCRN receives a revalidation timeout event message, the PCRN may retrieve the extension time for the subscriber and determine a new revalidation timeout by adding the extension time to the current time. The PCRN may then respond to the network event message with a new message including the new revalidation timeout.

Various exemplary embodiments relate to a Policy and Rules Charging Node (PCRN) for updating a session in response to an event message. The PCRN may include a first interface that receives an event message indicating that an event has occurred; a rule engine that determines a course of action based on the event; a second interface that communicates with a subscriber profile repository and receives an incremental value associated with the event for the subscriber; and a session manager that determines an update value based on the at least one incremental value and at least one reference value and transmits the update value via the first interface. The PCRN may also include a session data storage that stores data regarding at least one session; a timer that measures a current time; a GUI interface that communicates with a network operator; and a configuration engine that configures the rules engine and/or the subscription profile repository.

It should be apparent that, in this manner, various exemplary embodiments enable a PCRN to respond to network events. In particular, by defining incremental values for individual subscribers, the PCRN may respond to network events in a flexible manner for each subscriber.

BRIEF DESCRIPTION OF THE DRAWINGS

In order to better understand various exemplary embodiments, reference is made to the accompanying drawings, wherein:

FIG. 3 illustrates an exemplary data structure for storing session information;

FIG. 4 illustrates an exemplary data structure for storing subscriber records;

FIG. 5 illustrates an exemplary data structure for storing decision rules; and

DETAILED DESCRIPTION

Figure 1:
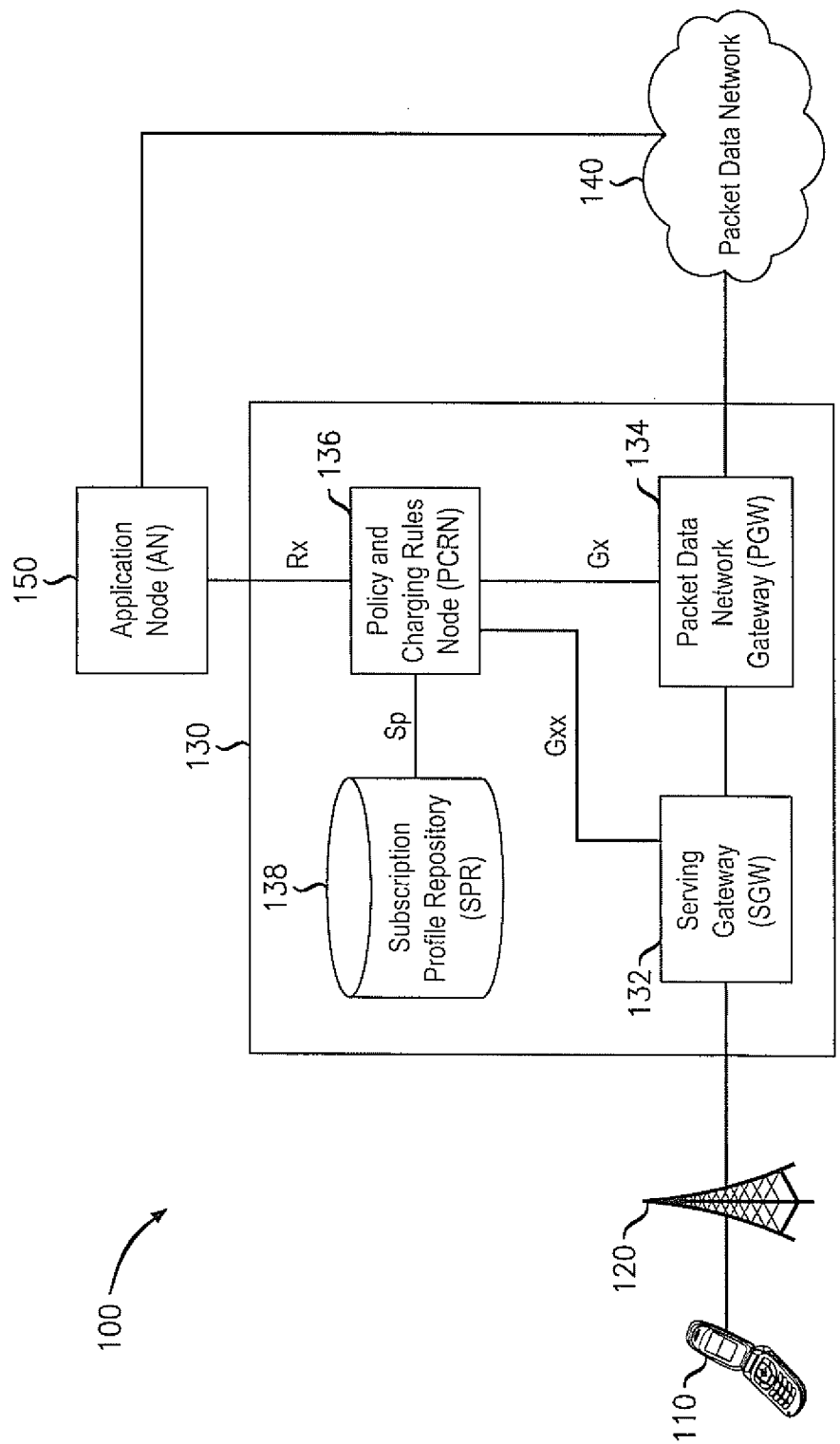
FIG. 1 illustrates an exemplary network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary network may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136 and a subscriber profile repository (SPR) 138.

Serving gateway (SGW) 132 may be a device that manages data paths between the base station 120 and PGW 134. The data paths may include virtual containers called bearers with unique Quality of Service (QoS) characteristics. The bearers may include virtual connections called service data flows (SDFs). In various embodiments where user equipment 110 is a mobile device and base station 120 is an eNodeB, SGW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

The SGW 132 may also provide event messages to the PCRN 136 via the Gxx interface in the form of a credit control request (CCR) message. SGW 132 may generate event messages to inform the PCRN 136 whenever there is a change in a bearer such as, for example, failure to allocate a bearer, termination of a bearer, preemption of a bearer or any other event for which an event trigger has been set.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may request new PCC rules from PCRN 136 by sending a CCR message via the Gx interface. PGW 134 may also report network events such as, for example, revalidation timeouts, QoS changes, and/or out of credit events. PGW 134 may also include a number of additional features such as, for example, packet filtering, deep packet inspection, and subscriber charging support.

Policy and charging rules node (PCRN) 136 may be a device that establishes and manages Internet Protocol Connectivity Access Network (IP-CAN) sessions, establishing an IP address for UE 110 and creating PCC rules for appropriate billing. IP-CAN sessions may exist indefinitely or only for a limited time. PCRN 136 may monitor existing sessions and cleanup any sessions that have expired to free up network resources.

PCRN 136 may also receive requests for application services, generate PCC rules, and provide PCC rules to the PGW 134 and/or other PCENs (not shown). PCRN 136 may be in communication with AN 150 via an Rx interface. PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the Proxy Mobile IP (PMIP) standard for example, PCRN 136 may also generate QoS rules. Upon creating a new QoS rule or upon request by the SGW 132, PCRN 136 may provide a QoS rule to SGW 132 via the Gxx interface.

Once PCC and QoS rules are installed in the PGW 134 and SGW 132 respectively, these components may be responsible for monitoring network connections. When an event occurs which, for example, may affect the session, the PGW 134 or SGW 132 may report the event to the PCRN 136 using a CCR message. Events may not be limited to errors and may include any event for which PCRN 136 previously provisioned an event trigger to SGW 132 or PGW 134 and any event that does not require an event trigger. PCRN 136 may receive event messages from SGW 132 or PGW 134. PCRN 136 may identify the type of event and determine an appropriate response. For example, the event may be a revalidation timeout, which may require an update to the expiration time of a session if the session is to continue. PCRN 136 may determine an update value for the session based on at least one incremental value and at least one reference value. Incremental values may be defined for individual subscribers and stored in SPR 138. Some incremental values may be absolute values used for all subscribers. Reference values may include values measuring the state of the system such as, for example, the current time, number of active sessions, and available bandwidth. Reference values may also include information about the state of a subscriber's account such as, for example, current credit balance and current bandwidth allocation. Finally, PCRN 136 may respond to the message by including the update value in a message to SGW 132 and/or PGW 134.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, subscriber priority, and subscriber service preferences. Subscriber service preferences may include an indication of whether the subscriber is able to receive incremental service extensions, such as, for example an extension of service time. SPR 138 may also include incremental values indicating the amount of any allowed service extensions. An operator may control various elements of a subscriber profile via a web-portal based GUI. The GUI may present a subscriber's configuration form which may allow an operator to change subscriber service preferences and incremental values.

Packet data network 140 may be any network for providing data communications between user equipment 110 and other devices connected to packet data network 140, such as AN 150. Further, packet data network 140 may provide, for example, phone and/or Internet service to various user devices in communication with packet data network 140.

Application node (AN) 150 may be a device that provides an application service to user equipment 110. Thus, AN 150 may be a server or other device that provides, for example, streaming video service to user equipment 110. AN 150 may further be in communication with the PCRN 136 of the EPC 130 via an Rx interface. When AN 150 is to begin providing application service to user equipment 110, AN 150 may generate an application request message, such as an AA-Request (AAR) according to the Diameter protocol, to notify the PCRN 136 that resources should be allocated for the application service. Such an application request message may include information such as an identification of the subscriber using the application service and an identification of the particular service data flows that must be established within an IP-CAN session in order to provide the requested service. AN 150 may communicate such an application request to the PCRN via the Rx interface 215.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-5. UE 110 may establish an IP-CAN session to receive an IP address and communicate with PDN 140. PCRN 136 may be responsible for managing the IP-CAN session. In particular, PCRN 136 may establish a limited duration for the IP-CAN session by provisioning a revalidation timeout period and event trigger to PGW 134. When the revalidation timeout period expires, PGW 134 may report the event to PCRN 136. PCRN 136 may then determine whether to extend the IP-CAN session. PCRN 136 may retrieve subscriber information for SPR 138 to determine whether to extend the IP-CAN session. PCRN 136 may use one or more incremental values included in the subscriber information along with one or more reference values to calculate a new revalidation timeout period. PCRN 136 may then store the new revalidation timeout period and send a message to PGW 134 with the new revalidation timeout period.

Figure 2:
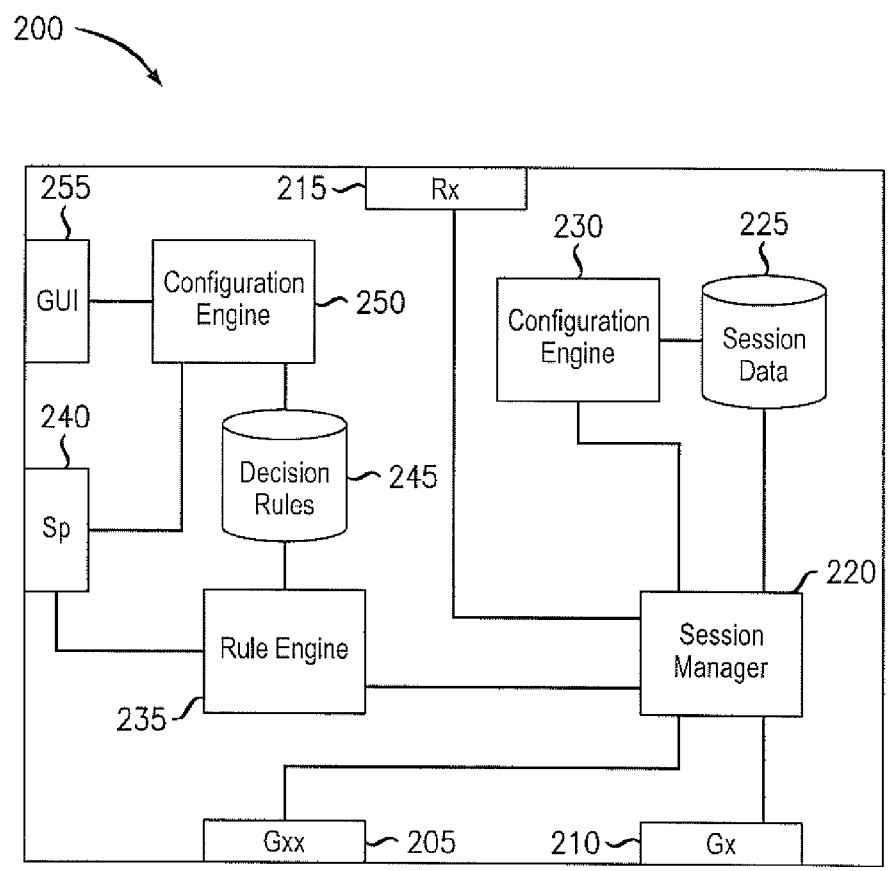
FIG. 2 illustrates an exemplary policy and control rules node (PCRN) for managing IP-CAN sessions.

FIG. 2 illustrates an exemplary policy and control rules node (PCRN) 200 for managing IP-CAN sessions. PCRN 200 may correspond to PCRN 136 of exemplary subscriber network 100. PCRN 200 may include Gx interface 205, Gxx interface 210, Rx interface 215, session manager 220, session data storage 225, timer 230, rule engine 235, Sp interface 240, decision rules storage 245, configuration engine 250, and graphical user interface (GUI) 255.

Gxx interface 205 may be an interface comprising hardware and/or executable instructions encoded on a machine-readable storage medium configured to communicate with a serving gateway such as SGW 132. Such communication may be implemented according to the 3GPP TS 29.212. For example, Gxx interface 205 may receive IP-CAN session establishment requests and event messages from SGW 132 and send QoS rules to SGW 132.

Gx interface 210 may be an interface comprising hardware and/or executable instructions encoded on a machine-readable storage medium configured to communicate with a packet data network gateway, such as PGW 134. Such communication may be implemented according to the 3GPP TS 29.212. For example, Gx interface 210 may receive service requests and event messages from PGW 134 and send PCC rules to PGW 134.

Rx interface 215 may be an interface comprising hardware and/or executable instructions encoded on a machine-readable storage medium configured to communicate with a packet data network gateway, such as PGW 134. Such communication may be implemented according to the 3GPP TS 29.214. For example, Rx interface 215 may receive application requests from AN 150.

Session manager 220 may include hardware and/or executable instructions encoded on a machine-readable storage medium configured to establish and manage IP-CAN sessions. Session manager 220 may receive session establishment requests directly from SGW 132 via Gxx interface 205 or indirectly through Gx interface 210. Session manager 220 may use rule engine 235 to determine various aspects of the session. For example, rule engine 235 may provide an initial revalidation timeout time for new sessions. Once a session is established, session manager 220 may receive event messages indicating a possible change in session status. Session manager 220 may pass the event messages to rule engine 235 to determine an appropriate action. Session manager 220 may store session data regarding active sessions in session data storage 225. Session manager 220 may also monitor active sessions and terminate expired sessions. Session manager 220 may manage sessions by updating information in session data storage 225 and communicating changes in the session to the appropriate network elements via Gxx interface 205, Gx interface 210, and Rx interface 215. Session manager 220 may use timer 230 to determine if any sessions have expired.

Session data storage 225 may be any machine-readable medium capable of storing session data. As will be described in further detail with regard to FIG. 3, session data may include a session ID, subscription ID, PCC rules, QoS rules, event triggers and revalidation timeout for each session.

Timer 230 may include hardware and/or executable instructions encoded on a machine-readable storage medium configured to determine when a session has expired. Timer 230 may monitor the current time. Timer 230 may compare the current time with revalidation timeout times stored in session data 225. If the current time is equal to or greater than the session revalidation timeout time, timer 230 may signal session manager 220 to terminate the session. Timer 230 may also provide the current time to session manager 220 and/or rule engine 235 for use in establishing and updating sessions.

Rule engine 235 may include hardware and/or executable instructions encoded on a machine-readable storage medium configured to make policy decisions regarding sessions. Rule engine 235 may make policy decisions by selecting decision rules from decision rules storage 245. Rule engine 235 may select decision rules according to information received in request messages, event messages and information in SPR 138. Rule engine 235 may access SPR 138 via Sp interface 240.

Sp interface 240 may be an interface including hardware and/or executable instructions encoded on a machine-readable storage medium configured to communicate with an SPR such as SPR 138. Sp interface 240 may transmit record requests and receive subscription profile records. Subscription profile records may include subscriber attributes such as, for example, subscriber preferences and incremental values. Sp interface 240 may also transmit configuration requests to change data in SPR 138. Configuration requests may add custom attributes to subscriber records. Configuration requests may also set the value of subscriber attributes.

Decision rules storage 245 may be any machine-readable medium capable of storing decision rules. As will be described in further detail with regard to FIG. 5, decision rules may define one or more conditions for which the rule applies. For example, a decision rule may apply only when rule engine 235 is considering a certain type of event message such as a revalidation timeout message. Decision rules may also define one or more actions which may be taken if the rule applies. Decision rules may be configured using configuration engine 250 and GUI 255. Decision rules may use information stored in SPR 138 such as, for example, subscriber preferences and incremental values. Rules may also use reference values such as the current time. Rule engine 235 may select which rule to apply based on the message type such as, for example, an Event-Trigger AVP.

Configuration engine 250 may include hardware and/or executable instructions encoded on a machine-readable storage medium configured to modify rules in decision rule storage 245 and subscriber information in SPR 138. Configuration engine 250 may modify subscriber information in SPR 138 by transmitting configuration requests via Sp interface 240. Configuration engine 250 may use configuration requests to define custom attributes such as, for example, subscriber preferences and incremental values. Configuration engine 250 may also set values for particular subscriber attributes. Configuration engine 250 may modify decision rule storage 245 by writing new rules or changing existing rules.

GUI 255 may include hardware and/or executable instructions encoded on a machine-readable storage medium configured to allow an operator to use configuration engine 250. GUI 255 may be accessible to an operator or network administrator via a web-portal. GUI 255 may present a human readable representation of data stored in SPR 138 and/or decision rules storage 245.

FIG. 3 illustrates an exemplary data structure 300 for storing session information. Data arrangement 300 may be, for example, a table in a database stored in session data storage 225. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include data fields such as, for example, session ID field 305, subscription ID field 310, IP address field 315, PCC rules field 320, QoS Rules field 325, event triggers field 330 and revalidation timeout field 335. Data arrangement 300 may include additional fields (not shown) required or useful in defining sessions. Data arrangement 300 may include multiple entries for sessions such as, for example, entries 340, 345 and 350.

Session ID field 305 may include a name assigned to an individual IP-CAN session. Session ID field 305 may be assigned by session manager 220 during session establishment. Session ID field 305 may be used as the Session-ID AVP in Diameter messages regarding a particular IP-CAN session. Subscription ID field 310 may include one or more names, numbers, and/or strings used to identify a subscription or subscriber record associated with an IP-CAN session. Subscription ID 310 field may include, for example, International Mobile Subscriber Identification numbers (IMSI), Mobile Station International Subscriber Directory Numbers (MSISDN), Session Initiation Protocol Uniform Resource Indicators (SIP URI), and/or Network Access Identifiers (NAI). Subscription ID 310 may be used to request subscriber records from SPR 138. IP Address 315 may be the IP address of a UE associated with the IP-CAN session. IP Address 315 may be an IPv4 address or an IPv6 address.

PCC rules field 320 may include a list of names of active PCC rules for the session. The listed PCC rules may also be active in the PCEF of PGW 134. QoS Rules field 325 may include a list of names of active QoS rules for the session. The listed QoS rules may also be active at SGW 132. QoS rules field 325 may correspond to or be identical to PCC rules field 320. Event triggers field 330 may include a list of event triggers which PCRN 136 has provisioned to PGW 134. Each event trigger may indicate an event for which PCRN 136 expects PGW to report when the event occurs.

Revalidation timeout field 335 may indicate a time at which the IP-CAN session may expire unless it is revalidated first. Revalidation timeout field 335 may include a Network Time Protocol (NTP) time. If no revalidation timeout is defined for a session, this may indicate that the session may continue indefinitely. Timer 230 may compare revalidation timeout 335 with the current time to determine if a session has expired.

As an example of an entry in data arrangement 300, entry 340 may indicate a session with a session ID of "0x284B" for a subscriber "10000000000001" with an IP address of "123.45.67.89." Entry 340 indicates that session "0x284B" has two PCC rules and two matching QoS rules active. Entry 340 indicates that three event triggers (2, 6, and 17) have been provisioned to PGW 134. Event trigger 17 may indicate a revalidation timeout event trigger requiring PGW 134 to report a revalidation timeout event occurring when the current time reaches the revalidation timeout field 235 with a value of "13B2:38F9:2392:3929:2092:B293:A392:284D."

As a second example, entry 345 may indicate a session with a session ID of "0x72A3" for a subscriber "10000000000002" with an IP address of "123.12.3.1." Entry 340 indicates that session "72A3" has one active PCC rule and a matching QoS rule. Event triggers field 330 includes a value of 14 that may indicate that no event triggers have been provisioned. Entry 350 may indicate that data arrangement 300 may include additional entries for additional sessions.

FIG. 4 illustrates an exemplary data structure 400 for storing subscriber records. Data arrangement 400 may be, for example, a table in a database stored in SPR 138. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include data fields such as, for example, subscription ID field 405, enable extensions field 410, extension time field 415, enable credit increase field 420, and credit increase amount field 425. Data arrangement 400 may include additional fields (not shown) required or useful in defining subscriber records. Additional fields may include custom attributes defined by an operator or network administrator. Data arrangement 400 may include multiple records such as for example, records 430, 435 and 440.

Subscription ID field 405 may include one or more names used to identify a subscription or subscriber record associated with an IP-CAN session. Subscription ID field 405 may correspond to subscription ID field 310. Enable extensions field 410 may indicate whether the subscriber is allowed to receive session extensions when the revalidation timeout arrives. Enable extensions field 410 may be described as a subscriber preference because it defines whether a function is allowed for a subscriber. Extension time field 415 may indicate the length of an extension. Extension time field 415 may be indicated as an NTP time. Enable credit increase field 420 may indicate whether the subscriber is allowed to receive a reallocation of credit when it runs out of credit. Enable credit increase field 420 may be considered a subscriber preference. Credit increase amount field 425 may indicate a number of credit units that may be added to the current credit.

As an example of an entry in data arrangement 400, record 430 may indicate a record with a subscription ID of "10000000000001." This subscription has extensions enabled with an extension time of 24 hours. This subscription also allows credit increases of 100 units. As a second example, record 435 for subscription ID "100000000000002" has extensions enabled with an extension time of 1 week. Credit increases are not allowed for the second subscription. Record 440 may indicate that data arrangement 400 may include additional entries for additional subscription IDs.

FIG. 5 illustrates an exemplary data arrangement 500 for storing decision rules. Data arrangement 500 may be, for example, a table in a database stored in decision rules storage 245. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include data fields such as, for example, conditions field 505 and action field 510. Data arrangement 400 may include additional fields (not shown) required or useful in defining decision rules. Data arrangement 500 may include multiple entries for rules such as, for example, rules 515, 520 and 525.

Condition field 505 may indicate one or more conditions that must be satisfied for the rule to apply. Conditions may include values such as, for example, message elements, subscriber preferences, incremental values, reference values and any other value useful for defining when a rule should apply. Action field 510 may indicate an action that PCRN 136 may perform. Actions may include calculating an update value based on incremental values and/or a reference values. Actions may also include other functions performed by PCRN 136, such as, for example, terminating a session.

As an example of an entry in data arrangement 500, rule 515 may indicate a rule that is applicable when PCRN 136 receives an event message containing an event trigger of 17 or REVALIDATION_TIMEOUT. Rule 515 may further require the enable extensions field 410 of the subscriber record to be true. Rule 515 may indicate that, when the conditions are satisfied, the revalidation timeout value should be set to the current time plus the extension time field of the subscriber record.

As a second example of an entry in data arrangement 500, rule 520 may indicate a rule that is applicable when PCRN 136 receives an event message containing an event trigger of 15 or OUT_OF_CREDIT. Rule 520 may further require the enable credit increase field 420 of the subscriber record to be true. Rule 520 may indicate that, when the conditions are satisfied, the credit value should be set to the credit increase amount field of the subscriber record.

Figure 6:
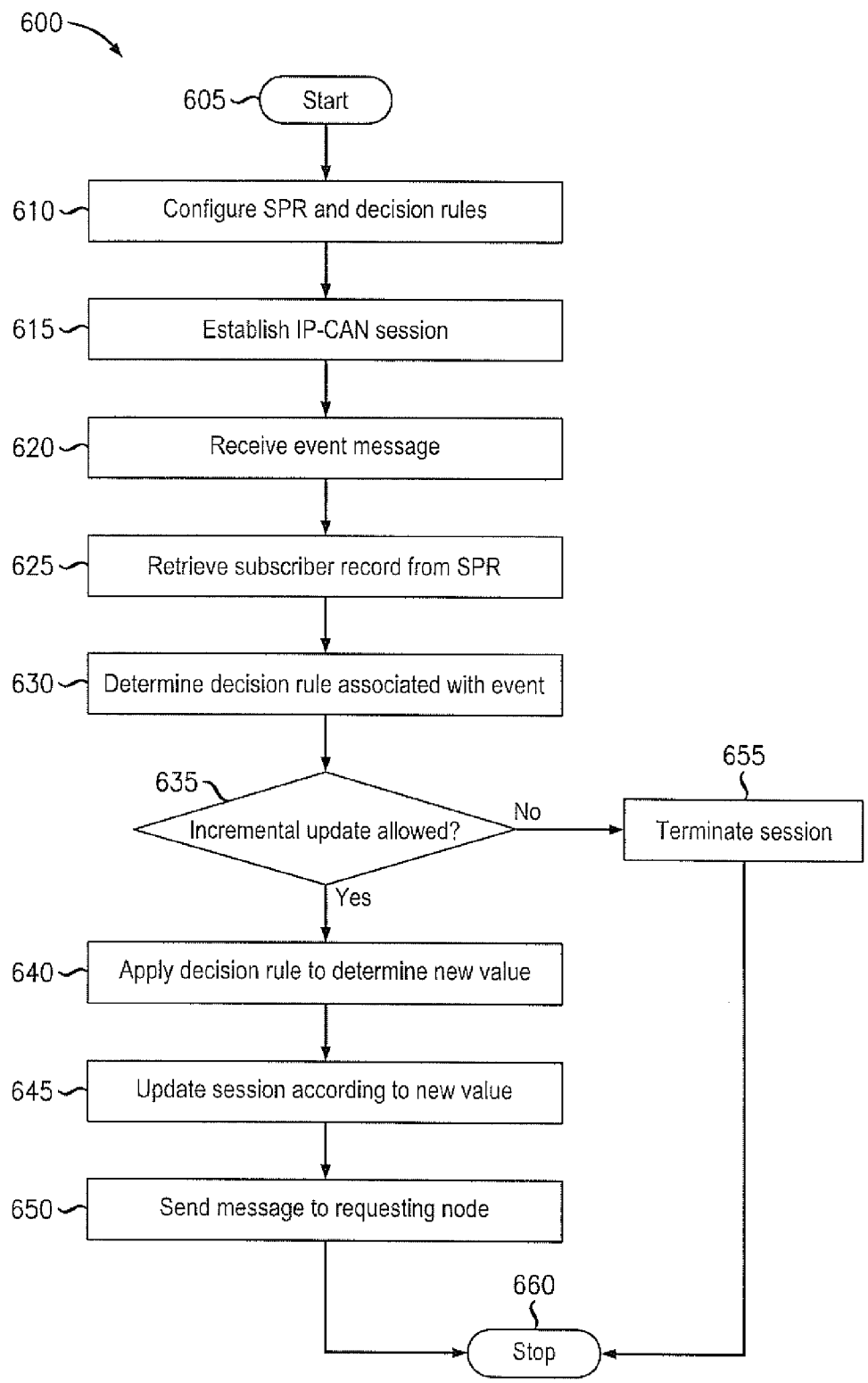
FIG. 6 illustrates an exemplary method for managing IP-CAN sessions.

FIG. 6 illustrates an exemplary method 600 for managing IP-CAN sessions. The method 600 may begin at step 605 and may proceed to step 610. In step 610, configuration engine 250 may configure SPR 138 and decision rules storage 245. Configuration engine 250 may receive input from GUI 255. Configuration engine 250 may configure SPR 138 via Sp interface 240 by sending a configuration request with custom attributes and new values. Configuration engine 250 may configure decision rules storage 245 by adding, deleting or modifying rules. The method 600 may then proceed to step 615.

In step 615, PCRN 136 may establish an IP-CAN session for a subscriber and UE 110. Session manager 220 may receive a session establishment request via Gx interface 210. Session manager 220 may use rule engine 235 to make policy decisions for establishing the IP-CAN session based on request contents, subscriber information and decision rules. Session manager 220 may store session data for the new IP-CAN session in session data storage 225. Session manager 220 may send messages to network components to install PCC and QoS rules to implement the IP-CAN session. The method 600 may then proceed to step 620.

In step 620, PCRN 136 may receive an event message from SGW 132 via the Gxx interface 205 or PGW 134 via the Gx interface 210. Session manager 220 may determine with which IP-CAN session the event message is associated using session data storage 225. Session manager 220 may then pass the message and session data to rule engine 235. The method may then proceed to step 625.

In step 625, the rule engine 235 may request a subscriber profile from SPR 138 via Sp interface 240. Rule engine 235 may use a subscription ID from the event message or session data to request a subscriber profile. The subscriber profile may include one or more incremental values used by the determined decision rule. The subscriber profile may also include subscriber preferences indicating whether a decision rule can be applied to the subscriber. Once rule engine 235 receives the subscriber profile, the method 600 may proceed to step 630.

In step 630, rule engine 235 may determine a decision rule to apply to the event message. Rule engine 235 may search for a rule in decision rule storage 245. A decision rule may apply to the event message if the event message satisfies all the criteria of the rule. In various exemplary embodiments, more than one rule may apply to an event message. Once rule engine 235 determines a rule, the method 600 may proceed to step 635.

In step 635, rule engine 235 may determine whether an incremental update is allowed for the subscriber. For example, rule engine 235 may check extensions enabled field 410 to determine whether time extensions are allowed for the subscriber. Rule engine 235 may alternatively check an incremental value such as, for example, extension time field 415 because, in some embodiments, an incremental value of zero may indicate that incremental updates are not allowed. If incremental updates are allowed, the method 600 may proceed to step 640. If incremental updates are not allowed, the method 600 may proceed to step 655.

In step 640, rule engine 235 may apply the determined decision rule to determine an update value. The decision rule may require combining one or more incremental values with one or more reference values. For example, a rule for an extension of time after a revalidation timeout event may require adding a subscription extension time to the current time. In this example, the subscription extension time is an incremental value defined in the subscriber profile and the reference value is determined from the state of the system. Other examples of reference values may include a subscriber's current balance and measurements of system usage. Once rule engine 235 determines an update value, it may pass the value to session manager 220 and the method 600 may proceed to step 645.

In step 645, session manager 220 may implement the update at PCRN 136. Session manager 220 may update session data in session data storage 225. This update may require changing session data, PCC rules and/or QoS rules. In step 650, session manager 220 may update other network components including the requesting node by generating the appropriate network messages. For example, session manager 220 may generate a CCA command to update PGW 134 with a new value for the revalidation timeout. The method 600 may then proceed to step 660 where it ends.

Returning to step 635, the method may proceed to step 655 if incremental updates are not allowed or if no incremental value is defined for the subscriber. In step 655, PCRN 136 may terminate the IP-CAN session or take other action appropriate for the event. Rule engine 235 may trigger session manager 220 to terminate the session when it determines that an extension is not allowed. Alternatively, rule engine 235 may refrain from acting and allow timer 230 to terminate the session when it detects that the current time has passed the revalidation time. In either case, session manager 220 may generate the appropriate network messages to terminate the session. Session manager 220 may send messages to SGW 132 and PGW 134 to uninstall QoS and PCC rules respectively. Session manager 220 may also examine PCC rules 320 to determine which AN(s) are providing services within the IP-CAN session. Session manager 220 may then send termination messages to the AN(s). The method 600 may then proceed to step 660 where the method ends.

Having described exemplary components and methods for the operation of exemplary subscriber network 100 and PCRN 200, an example of the operation of exemplary network 100 and PCRN 200 will now be provided with reference to FIGS. 1-6. PCRN 136 may correspond to PCRN 200. The contents of session data storage 225 may be represented by data arrangement 300. The contents of SPR 138 may be represented by data arrangement 400. The contents of decision rules storage 245 may be represented by data arrangement 500.

The process may begin when a network operator uses the GUI 255 and configuration engine 250 to configure PCRN 136 and SPR 138. The operator may wish to configure the system to provide a day-pass service allowing subscribers to have access for a single day. The operator may configure SPR 138 to include custom attributes such as, for example, enable extensions field 410 and subscription extension time field 415. The operator may also add a rule to decision rules storage 245 to allow extensions based on these custom attributes during a revalidation timeout event. Rule 515 may be an example of a possible rule for revalidation timeout events. The operator may configure individual subscriber records to include appropriate values for the custom attributes when the subscriber activates or renews a service.

A subscriber may connect to the system and request an IP-CAN session. The system may establish an IP-CAN session for a subscriber when the UE connects to the system. Session manager 220 may use rule engine 235 to make policy decisions. Session manager 220 may then store session data in session data storage 225 and may send messages to SGW 132 and PGW 134 to establish the session. Record 340 may represent an IP-CAN session for a day-pass service. Notably, record 340 includes a revalidation timeout indicating when the day-pass expires and has provisioned event trigger 17 to PGW 134 requiring revalidation timeout event triggers.

When the revalidation timeout arrives, PGW 134 may send an event message indicating that a revalidation timeout event has occurred. Session manager 220 may retrieve session data from session data storage 225 and pass the message and session data to rule engine 235. Rule engine 235 may then retrieve a subscriber profile from SPR 138 based on a subscription ID included in the event message or session data. Record 430 includes the same subscription ID as record 340, so SPR 138 may return record 430. Rule engine 235 may then select rule 515 because the conditions are satisfied. Rule engine 235 may then determine that incremental updates are allowed because in record 430 the value of enable extensions 410 is true. Rule engine 235 may then determine a new value for revalidation timeout 335 by adding the extension time 415 with a value of 24 hours to the current time, which may be an NTP time measured by timer 230. Session manager 220 may then update revalidation timeout 335 in session data storage 225. Session manager 225 may then check PCC rules 320 to determine if any PCC rules need updating. Finally, session manager 225 may send a network message to PGW 134 including the new revalidation timeout to indicate that the session has been extended.

According to the foregoing, various exemplary embodiments provide for responding to event messages. In particular, by using incremental values to define the response to a network event, the PCRN flexibly responds to network events for each subscriber.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a Policy and Charging Rules Node (PCRN) for updating a session associated with a subscriber in response to an event, the method comprising:
   receiving at the PCRN an event message from an enforcement node indicating that an event has occurred within the session;
   retrieving subscriber information including at least one incremental value associated with the event for the subscriber, the incremental value defining an amount of an incremental change for the subscriber in response to the event;
   determining an updated value based on the at least one retrieved incremental value and at least one reference value; and
   responding to the event message by sending an update message including the updated value to the enforcement node.

2. The method of claim 1 further comprising: updating session data to include the updated value for the session.

3. The method of claim 1 further comprising:
   configuring a subscriber profile repository to include at least one incremental value for an individual subscriber.

4. The method of claim 1 further comprising:
   configuring at least one rule for determining an updated value based on at least one incremental value and at least one reference value; and
   selecting a rule based on the event.

5. The method of claim 1 wherein the event message indicates that a revalidation timeout has occurred, the incremental value is a subscription extension time, and the reference value is a current time,
   wherein the step of determining an updated value comprises adding the subscription extension time to the current time.

6. The method of claim 1 further comprising: if there is no incremental value associated with the subscriber, terminating the session.

7. The method of claim 5 further comprising: if the subscription extension time indicates that extensions are not allowed for the subscriber, terminating the session.

8. A Policy and Charging Rules Node (PCRN) for updating a session in response to an event message, the PCRN comprising:
   a first interface that receives an event message from an enforcement node indicating that an event has occurred in a session of a subscriber;
   a second interface that communicates with a subscriber profile repository and receives at least one incremental value associated with the event for the subscriber, the incremental value defining an amount of an incremental change for the subscriber in response to the event;
   a rule engine that selects a decision rule based on the event and applies the decision rule to determine an update value based on the at least one incremental value and at least one reference value; and
   a session manager that transmits the update value to the enforcement node via the first interface.

9. The PCRN of claim 8 further comprising:
   a session data storage that stores data regarding at least one session, wherein the session manager updates data regarding at least one session to include the update value.

10. The PCRN of claim 8 further comprising:
    a GUI interface that communicates with a network operator; and
    a configuration engine that configures the subscription profile repository based on input received via the GUI interface.

11. The PCRN of claim 10 further comprising:
    a decision rules storage that stores decision rules,
    wherein the configuration engine configures the decision rules storage based on input received via the GUI interface and the rules engine selects a decision rule from the decision rule storage.

12. The PCRN of claim 8 further comprising:
    a timer that measures a current time and terminates sessions with a revalidation timeout prior to the current time, wherein the session manager uses the current time as a reference value.

13. A tangible non-transitory machine-readable storage medium encoded with instructions executable by a processor of a Policy and Charging Rules Node (PCRN) to update a session associated with a subscriber in response to an event, the machine-readable storage medium comprising:
    instructions for receiving at the PCRN an event message from an enforcement node indicating that an event has occurred within the session;
    instructions for retrieving subscriber information including at least one incremental value associated with the event for the subscriber, the incremental value defining an amount of an incremental change for the subscriber in response to the event;
    instructions for determining an updated value based on the at least one retrieved incremental value and at least one reference value; and
    instructions for responding to the event message by sending to the enforcement node an update message including the updated value.

14. The tangible non-transitory machine-readable storage medium of claim 13 further comprising: instructions for updating session data to include the updated value for the session.

15. The tangible non-transitory machine-readable storage medium 13 further comprising: instructions for configuring a subscriber profile repository to include at least one incremental value for an individual subscriber.

16. The tangible non-transitory machine-readable storage medium of claim 13 further comprising:
    instructions for configuring at least one rule for determining an updated value based on at least one incremental value and at least one reference value; and
    instructions for selecting a rule based on the event.

17. The tangible non-transitory machine-readable storage medium of claim 13 wherein the event message indicates that a revalidation timeout has occurred, the incremental value is a subscription extension time, and the reference value is a current time, wherein the instructions for determining an updated value comprise instructions for adding the subscription extension time to the current time.

18. The tangible non-transitory machine-readable storage medium of claim 13 further comprising: instructions for terminating the session if there is no incremental value associated with the subscriber.

19. The tangible non-transitory machine-readable storage medium of claim 17 further comprising: instructions for terminating the session if the subscription extension time indicates that extensions are not allowed for the subscriber.

* * * * *